3,014,955
ORGANIC PHOSPHORUS COMPOUNDS
Ernst Beriger, Allschwil, Switzerland, assignor to Ciba Limited, Basel, Switzerland
No Drawing. Filed June 22, 1959, Ser. No. 821,696
Claims priority, application Switzerland July 10, 1958
11 Claims. (Cl. 260—461)

This invention provides organic phosphorus compounds of the general formula

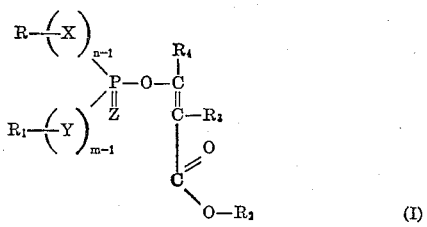

in which R and $R_1$ each represent an alkyl, cycloalkyl, aralkyl, aryl or heterocyclic radical which may be substituted or R and $R_1$ together form part of a ring system, $R_2$ represents a branched or unbranched alkyl radical interrupted by at least one oxygen or sulfur atom, preferably by at least two oxygen or sulfur atoms, or represents an alkyl-aryl radical, $R_3$ represents a hydrogen or halogen atom or an alkyl radical, $R_4$ represents an aliphatic, alicyclic, aromatic or heterocyclic radical, X and Y each represent —O—, —S—, —NH— or

and Z represents an oxygen or sulfur atom, and $n$ and $m$ each represent the whole number 1 or 2.

The above Formula I comprises any possible stereoisomers, particularly the cis- and corresponding trans-isomers.

The compounds of the above formula are new and are valuable agents for combating pests, especially insects and acarids. They are active against various stages of development, such as eggs, larvae and imagines, and they are effective as contact poisons and stomach poisons. Suitable substitution products are distinguished by rapid hydrolytic decomposition in the air and by their relatively low toxicity towards warm-blooded animals, so that they can be used for combating pests in crops shortly before they are harvested. Especially valuable as insecticides are compounds of the general formula

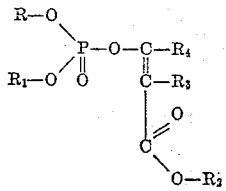

in which R and $R_1$ each represent a lower alkyl group containing 1–4 carbon atoms, and advantageously a methyl or ethyl group, $R_2$ represents a radical of the formula $[C_{m+1}H_{2m+2}Z]_pC_nH_{2n+1}$, or of the formula

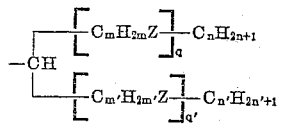

or of the formula

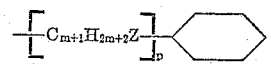

in which $m$, $m'$, $n$ and $n'$ each represent a whole number from 1 to 4, $p$, $q$ and $q'$ a whole number from 1 to 10, $p$ being preferably at least 2, and Z represents an oxygen or sulfur atom, $R_3$ represents a hydrogen or chlorine atom, and $R_4$ represents a lower alkyl group, especially a methyl group, or a phenyl group which may be substituted. Among these compounds those of the formula

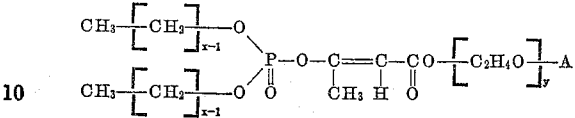

or of the formula

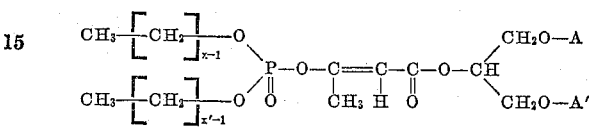

in which A and A' represent an alkyl group containing 1–4 carbon atoms or a phenyl group, and $x$ and $x'$ each represent the whole number 1 or 2, and $y$ represents a whole number from 1 to 10, possess an especially high activity.

The invention also provides a preferred embodiment of the process for the manufacture of the above new compounds, wherein a compound of the formula

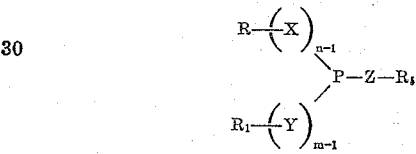

in which R, $R_1$, $n$, $m$, X, Y and Z have the meanings given above, and $R_5$ represents an alkyl group containing 1–4 carbon atoms, is condensed with a compound of the formula

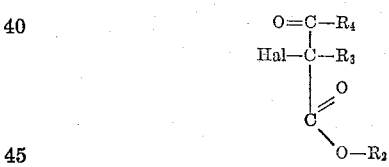

in which $R_2$, $R_3$ and $R_4$ have the meanings given above, and Hal represents a halogen atom, such as bromide or preferably chlorine, accompanied by the splitting off of a compound of the formula $R_5$ Hal.

The new compounds can also be obtained by reacting a compound of the formula

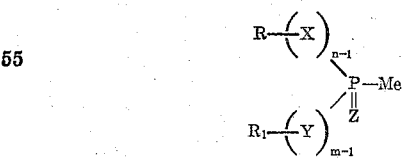

in which R, $R_1$, $n$, $m$, X, Y and Z have the meanings given above, and Me represents an alkali metal, such as sodium, with a compound of the formula

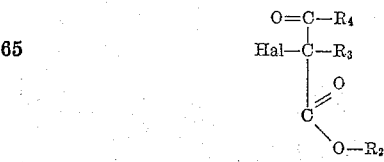

in which $R_2$, $R_3$, $R_4$ and Hal have the meanings given above. The compounds in which $R_3$ represents a hydrogen atom or alkyl group can also be made by the following condensation:

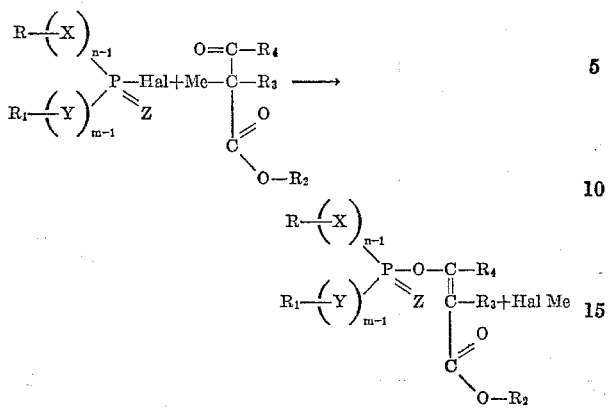

The compounds of the formula

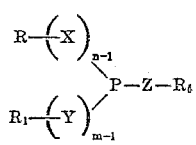

used as starting materials are derivatives of trivalent phosphorus, whereas the compounds of the invention are derivatives of pentavalent phosphorus.

Among the compounds of the above formula those are most easily obtainable in which the symbols X, Y and Z represent oxygen atoms. They correspond to the formula

and can be made by methods in themselves known.

The aliphatic radicals which the symbols R and $R_1$ may represent, may have straight or branched chains and be saturated or unsaturated, and they may be substituted or unsubstituted. There may be mentioned, for example, the following groups: Methyl, ethyl, propyl, isopropyl, butyl, hexyl, 2-ethylbutyl, octyl, 2-butyloctyl, dodecyl, octadecyl, allyl, 2-chlorethyl; and also radicals containing thiocyano, cyano or ester groups. The radicals R and $R_1$ may be identical or different from one another. $R_5$ is advantageously a low molecular alkyl group having 1 to 4 carbon atoms. There may be mentioned, for example, the following compounds: Trimethylphosphite, triethylphosphite, tripropylphosphite, diethyl dodecylphosphite, tri-(2-chloroethyl)-phosphite or the ester of the formula

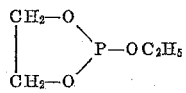

The aromatic radicals which R and $R_1$ may represent, may be mononuclear or polynuclear and may contain nuclear substituents. There may be mentioned the phenyl, 2- or 4-chlorophenyl, 2:4-dichlorophenyl, 4-methoxyphenyl, 4-nitrophenyl, naphthyl and 4-diphenyl groups. There may be mentioned compounds, such as 2:4-dichlorophenyldiethyl phosphite and 4-chlorophenyldimethyl phosphite. There may also be mentioned compounds in which one or two radicals are bound directly through a carbon atom to the phosphorus atom, for example, phenyl-phosphinic acid diethyl ester of the formula

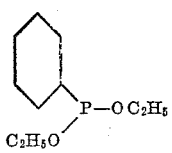

Among the araliphatic radicals which R and $R_1$ may represent, there may be mentioned the benzyl group; among cycloaliphatic radicals the cyclohexyl group; and among heterocyclic radicals the tetrahydrofurfuryl group. Starting materials containing such radicals are, for example, cyclohexyl diethyl phosphite, tetrahydrofurfuryl dimethyl phosphite and dibenzylpropyl phosphite. Among the compounds in which X and Y represent sulfur atoms there may be mentioned triethyl thiophosphite of the formula

and among those in which X and Y represent nitrogen there may be mentioned the compound of the formula

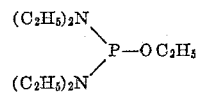

The compounds of the general formula

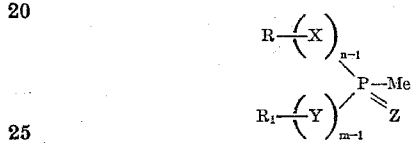

are salts of disubstituted phosphites or phosphinic acids, for example, the sodium salts of dimethyl phosphite, diethyl phosphite, dodecylethyl phosphite, cyclohexylmethylphosphite, tetrahydrofurfurylethyl phosphite or benzylethyl phosphite.

The compounds of the general formula

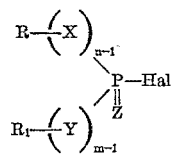

are phosphoric acid monohalides, for example, phosphoric acid diethyl ester monochloride, thiophosphoric acid diethyl ester monochloride and bis-dimethylamido-phosphoric acid monochloride.

The compounds of the general formula

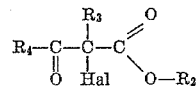

are esters of halogenated acyl-acetic acids derived from aliphatic, alicyclic, aromatic or heterocyclic carboxylic acids, and advantageously aceto-, benzoyl-, hexahydrobenzoyl-, furoyl- or tetrahydrofuroyl-acetic acid, with monoalkyl ethers of monoaryl ethers of dihydric aliphatic alcohols or the corresponding thio-ethers. The radical $R_2$ may be a branched or unbranched alkyl or alkyl-aryl radical interrupted by at least one ether oxygen bridge or by a sulfide bridge, preferably by at least two ether oxygen bridges or sulfide bridges, and may correspond more especially to the formula

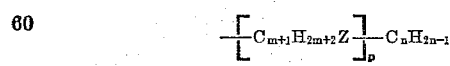

or

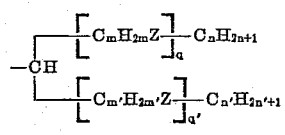

or

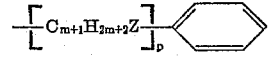

in which m, m', n and n' represent whole numbers from 1 to 4, p, q and q' represent a whole number from 1 to 10, p being preferably at least 2, and Z represents an oxygen or sulfur atom. There may be mentioned for example a lower alkoxyalkyl group such as the methoxyethyl, ethoxyethyl, propoxyethyl, or butoxyethyl group, or a phenoxyalkyl group such as the phenoxyethyl group; and particularly polyalkylene-glycol monoalkyl ether groups, such as the diethylene glycol monomethyl ether radical, the diethylene glycol monoethyl ether radical, the diethylene glycol monopropyl ether radical and the monoethylene glycol monomethyl ether radical, or glycerine-dialkyl ether groups, such as the glycerine-1:3-dimethyl ether radical. The radical $R_3$ may represent a halogen atom, advantageously a chlorine atom, or a hydrogen atom or an alkyl group preferably containing 1 to 4 carbon atoms, such as the methyl group. $R_4$ may represent a heterocyclic radical, such as the furfuryl or tetrahydrofurfuryl group, or an aryl radical, for example, the phenyl, chlorophenyl or nitrophenyl radical, or a cycloalkyl radical such as the cyclohexyl group, or an alkyl group such as the methyl or ethyl group. Among reaction components of the formula last mentioned above there may be mentioned: α-Chloracetoacetic acid-2-methoxyethyl ester, α-chloracetoacetic acid 2-phenoxyethyl ester, α:α-dichloracetoacetic acid-2-ethoxyethyl ester, α:α-dichloracetoacetic acid-2-phenoxyethyl ester, α:α-dichlorobenzoylacetic acid-2-ethoxyethyl ester, α:α-dichlorobenzoyl acetic acid-2-methoxyethyl ester, α:α-dichloro-4-chlorobenzoylacetic acid-2-ethoxyethyl ester, α-chloro-4-nitrobenzoyl-acetic acid-2-ethoxyethyl ester, α:α-dichlorofuroyl-acetic acid-2-ethoxyethyl ester and α:α-dichlorohexahydrobenzoyl acetic acid-2-ethoxyethyl ester.

For making the compounds of the invention the reaction components are heated at a raised temperature, for example, within the range of 50–200° C. and advantageously about 90° C. to 150° C. It may be of advantage or convenient to work in an inert solvent, such as benzene, toluene, xylene, chlorobenzene, and, if desired, in an atmosphere of an inert gas, for example, nitrogen, and/or under reduced pressure.

As stated above the compounds of this invention are valuable pest-combating agents, and especially insecticides and acaricides.

Accordingly, the present invention provides also pest combating preparations containing the new products as active principle, as well as a method of combating pests with such preparations. Advantageously, there are used compounds of the general formula

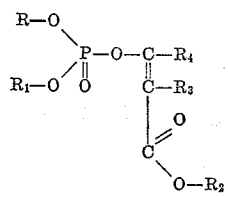

in which $R_2$ stands for a radical of the formula

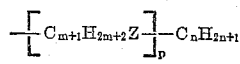

or of the formula

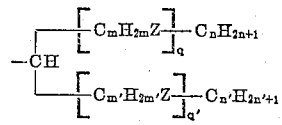

or of the formula

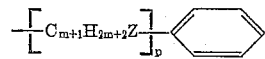

in which $m$, $m'$, $n$ and $n'$ stand for small whole numbers from 1 to 4, $p$, $q$ and $q'$ for whole numbers from 1 to 10, $p$ being preferably at least 2, and Z stands for oxygen or sulfur, $R_3$ for a hydrogen atom or a chlorine atom and $R_4$ for an alkyl radical of low molecular weight or a phenyl radical which may be substituted.

A wide variety of bodies can be protected against pests or harmful insects and acarids with the use of a preparation in which the support for the active principle may be a gaseous, liquid or solid substance. As bodies to be protected, or used as supports, may be mentioned, for example, air, more especially in rooms; liquids, such as water in ponds, and finally any dead or living solid substratum, such as any kind of object in lived-in rooms, in cellars, in lofts, in stables; furthermore furs, feathers, wool or the like; as well as living plants or animals in their different stages of development, provided that they are immune to the pest combating agents.

The combating of the pests is carried out by the usual methods, for example by treating the body to be protected with the compound in vapour form, for example as fumigants or in the form of dusting or spraying preparations, for example as solutions or suspensions prepared with water or with a suitable organic solvent such, for example, as alcohol, petroleum, tar distillates or the like. It is also possible to use aqueous solutions or aqueous emulsions of organic solvents containing the active principle for brushing, spraying or dipping the object to be protected.

The spraying and dusting preparations may contain the conventional inert fillers or identifying agents such as caolin, gypsum or bentonite or further additives or the like; they may also contain the usual wetting agents and adhesives to improve the wetting properties and the adhesion. The pest combating preparations may be manufactured in powder form or in the form of aqueous dispersions or pastes or of self-dispersing oils.

The pest combating preparation may contain a compound of the invention as the sole active principle or in combination with other insecticides and/or fungicides. Such preparations are used for plant protection according to the usual spraying, casting, dusting and fumigating methods.

Parts in the following examples are by weight, and the relationship between parts by weight and parts by volume is the same as that between the kilogram and the liter.

*Example 1*

A mixture of 12.15 parts of α:α-dichloroacetoacetic acid-2-ethoxy ethyl ester and 15 parts of chlorobenzene is heated to 140° C. In the course of 5 minutes 6.8 parts of trimethyl phosphite are added dropwise to the mixture. The reaction is completed by refluxing for a short period. 2.25 parts of methyl chloride have collected in a receptacle. The solvent and readily volatile constituents are removed in a water-jet vacuum at 95° C. bath temperature, to yield 16.05 parts of an oily liquid which can be distilled in a high vacuum and boils at 136–140° C. under a pressure of 0.02 mm. Hg.

The analysis of the condensation product obtained in this manner corresponds to the empirical formula $C_{10}H_{18}O_7ClP$.

Calculated: Cl, 11.20; P, 9.78%. Found: Cl, 11.24; P, 9.76%.

*Example 2*

9.1 parts of triethyl phosphite are added dropwise to a boiling mixture of 12.15 parts of α:α-dichloroacetoacetic acid-2-ethoxy ethyl ester and 15 parts of chlorobenzene. After completion of the dropwise addition the mixture is maintained at the boil for another hour, by which time 2.8 parts of ethyl chloride have collected in a cooled receptacle. The solvent and the readily volatile constituents are removed in a water-jet vacuum at 95° C. bath temperature, to yield 17.7 parts of the condensation product of the empirical formula $C_{12}H_{22}O_7ClP$, boiling at 146–150° C. under 0.015 mm. Hg pressure.

*Example 3*

15.25 parts of α:α-dichlorobenzoylacetic acid-2-ethoxy ethyl ester in 15 parts of chlorobenzene are heated to the boil and treated dropwise with 6.8 parts of trimethyl phosphite. When all has been added, the bath is maintained at 150–160° C. for 1 hour longer, by which time 2.4 parts of methyl chloride have collected in a cooled receptacle. The mixture is freed from the readily volatile constituents in a water-jet vacuum at a bath temperature of 95° C., to yield as residue 180 parts of a heavy oil which can be mixed with alcohol or acetone in any proportion.

Example 4

15.25 parts of α:α-dichlorobenzoylacetic acid-2-ethoxy ethyl ester in 15 parts of chlorobenzene are treated with 9.1 parts of triethyl phosphite as described in Example 3, whereby 3 parts of ethyl chloride are split off. The reaction mixture is evaporated in a water-jet vacuum to yield 20.1 parts of a heavy oil which is readily soluble in isopropanol and in acetone.

Example 5

15 parts of α-chloroacetoacetic acid-2-methoxy ethyl ester in 20 parts by volume of chlorobenzene are heated to 140° C. and treated dropwise with 10.5 parts of trimethyl phosphite. When the dropwise addition is complete the bath is maintained at 135–140° C. for 1 hour, by which time 3.4 parts of methyl chloride have collected in a cooled receptacle. The mixture is freed from the readily volatile constituents in a water-jet vacuum at 95° C. bath temperature, and the residue is distilled in a high vacuum; the product boils at 124–128° C. under 0.02 mm. Hg pressure.

Example 6

14.05 parts of triethyl phosphite are added dropwise to a boiling mixture of 15 parts of α-chloroacetoacetic acid-2-methoxy ethyl ester and 20 parts by volume of chlorobenzene. After the dropwise addition is complete the mixture is kept boiling for 1 hour longer, after which time 3.6 parts of ethyl chloride have collected in a cooled receptacle. The solvent and the readily volatile constituents are removed in a water-jet vacuum at 95° C. bath temperature, and the residue is distilled in a high vacuum. The product (18.3 parts) boils at 133–135° C. under 0.04 mm. Hg pressure.

The acetoacetic acid esters halogenated in the α-position, listed in the following table, can be reacted in an analogous manner with tertiary phosphites. The resulting phosphoric acid esters are characterized by their boiling points.

| No. | Acetoacetic acid ester | Degree of halogenation of the acetoacetic acid ester in α-position | Phosphite | Phosphoric acid ester | Boiling at ° C. | under mm. Hg |
|---|---|---|---|---|---|---|
| 1 | $CH_3COCH_2COOC_2H_4OCH_3$<br>B.P. 73° C. under 0.01 mm. Hg. | dichloride. | $(CH_3O)_3P$ | $(CH_3O)_2\overset{O}{\overset{\|}{P}}-O\overset{CH_3}{\overset{\|}{C}}=C\overset{Cl}{\underset{COOC_2H_4OCH_3}{}}$ | 147–148 | 0.04 |
| 2 | $CH_3COCH_2COOC_2H_4OCH_3$<br>B.P. 73° C. under 0.01 mm. Hg. | ...do..... | $(C_2H_5O)_3P$ | $(C_2H_5O)_2\overset{O}{\overset{\|}{P}}-O\overset{CH_3}{\overset{\|}{C}}=C\overset{Cl}{\underset{COOC_2H_4OCH_3}{}}$ | 136–140 | 0.03 |
| 3 | $CH_3COCH_2COOC_2H_4OC_2H_5$<br>B.P. 86° C. under 0.03 mm. Hg. | monochloride. | $(CH_3O)_3P$ | $(CH_3O)_2\overset{O}{\overset{\|}{P}}-O\overset{CH_3}{\overset{\|}{C}}=C\overset{H}{\underset{COOC_2H_4OC_2H_5}{}}$ | 130 | 0.05 |
| 4 | $CH_3COCH_2COOC_2H_4OC_2H_5$<br>B.P. 86° C. under 0.03 mm. Hg. | ...do..... | $(C_2H_5O)_3P$ | $(C_2H_5O)_2\overset{O}{\overset{\|}{P}}-O\overset{CH_3}{\overset{\|}{C}}=C\overset{H}{\underset{COOC_2H_4OC_2H_5}{}}$ | 132 | 0.035 |
| 5 | $CH_3COCH_2COOC_2H_4OC_3H_7(n)$<br>B.P. 86–89° C. under 0.04 mm. Hg. | ...do..... | $(CH_3O)_3P$ | $(CH_3O)_2\overset{O}{\overset{\|}{P}}-O\overset{CH_3}{\overset{\|}{C}}=C\overset{H}{\underset{COOC_2H_4OC_3H_7(n)}{}}$ | 130–133 | 0.04 |
| 6 | $CH_3COCH_2COOC_2H_4OC_3H_7(n)$<br>B.P. 86–89° C. under 0.04 mm. Hg. | ...do..... | $(C_2H_5O)_3P$ | $(C_2H_5O)_2\overset{O}{\overset{\|}{P}}-O\overset{CH_3}{\overset{\|}{C}}=C\overset{H}{\underset{COOC_2H_4OC_3H_7(n)}{}}$ | 132–134 | 0.02 |
| 7 | $CH_3COCH_2COOC_2H_4OC_3H_7(n)$<br>B.P. 86–89° C. under 0.04 mm. Hg. | dichloride. | $(CH_3O)_3O$ | $(CH_3O)_2\overset{O}{\overset{\|}{P}}-O\overset{CH_3}{\overset{\|}{C}}=C\overset{Cl}{\underset{COOC_2H_4OC_3H_7(n)}{}}$ | 152–154 | 0.1 |
| 8 | $CH_3COCH_2COOC_2H_4OC_3H_7(n)$<br>B.P. 86–89° C. under 0.04 mm. Hg. | ...do..... | $(C_2H_5O)_3P$ | $(C_2H_5O)_2\overset{O}{\overset{\|}{P}}-O\overset{CH_3}{\overset{\|}{C}}=C\overset{Cl}{\underset{COOC_2H_4OC_3H_7(n)}{}}$ | 148 | 0.02 |
| 9 | $CH_3COCH_2COOC_2H_4OC_4H_9$<br>B.P. 93–94° C. under 0.03 mm. Hg. | monochloride. | $(CH_3O)_3P$ | $(CH_3O)_2\overset{O}{\overset{\|}{P}}-O\overset{CH_3}{\overset{\|}{C}}=C\overset{H}{\underset{COOC_2H_4OC_4H_9}{}}$ | 139–140 | 0.03 |
| 10 | $CH_3COCH_2COOC_2H_4OC_4H_9$<br>B.P. 93–94° C. under 0.03 mm. Hg. | ...do..... | $(C_2H_5O)_3P$ | $(C_2H_5O)_2\overset{O}{\overset{\|}{P}}-O\overset{CH_3}{\overset{\|}{C}}=C\overset{H}{\underset{COOC_2H_4OC_4H_9}{}}$ | 144–147 | 0.02 |
| 11 | $CH_3COCH_2COOC_2H_4OC_4H_9$<br>B.P. 93–94° C. under 0.03 mm. Hg. | dichloride. | $(CH_3O)_3P$ | $(CH_3O)_2\overset{O}{\overset{\|}{P}}-O\overset{CH_3}{\overset{\|}{C}}=C\overset{Cl}{\underset{COOC_2H_4OC_4H_9}{}}$ | 154–155 | 0.09 |

| No. | Acetoacetic acid ester | Degree of halogenation of the acetoacetic acid ester in α-position | Phosphite | Phosphoric acid ester | Boiling at °C. | under mm. Hg |
|---|---|---|---|---|---|---|
| 12 | $CH_3COCH_2COOC_2H_4OC_4H_9$<br>B.P. 93–94° C. under 0.03 mm. Hg. | dichloride. | $(C_2H_5O)_3P$ | $(C_2H_5O)_2\overset{O}{\underset{\|}{P}}-O\overset{CH_3}{\underset{}{C}}=C\overset{Cl}{\underset{COOC_2H_4OC_4H_9}{}}$ | 151–155 | 0.03 |
| 13 | $CH_3COCH_2COOC_2H_4O-\bigcirc$<br>B.P. 128–133° C. under 0.01 mm. Hg. | monochloride. | $(CH_3O)_3P$ | $(CH_3O)_2\overset{O}{\underset{\|}{P}}-O\overset{CH_3}{\underset{}{C}}=C\overset{H}{\underset{COOC_2H_4O-\bigcirc}{}}$ | 184–189 | 0.13 |
| 14 | $CH_3COCH_2COOC_2H_5O-\bigcirc$<br>B.P. 128–133° C. under 0.01 mm. Hg. | ...do..... | $(C_2H_5O)_3P$ | $(C_2H_5O)_2\overset{O}{\underset{\|}{P}}-O\overset{CH_3}{\underset{}{C}}=C\overset{H}{\underset{COOC_2H_4O-\bigcirc}{}}$ | 182–187 | 0.05 |
| 15 | $CH_3COCH_2COOC_2H_4O-\bigcirc$<br>B.P. 128–133° C. under 0.01 mm. Hg. | dichloride. | $(CH_3O)_3P$ | $(CH_3O)_2\overset{O}{\underset{\|}{P}}-O\overset{CH_3}{\underset{}{C}}=C\overset{Cl}{\underset{COOC_2H_4O-\bigcirc}{}}$ | 193–198 | 0.15 |
| 16 | $CH_3COCH_2COOC_2H_4O-\bigcirc$<br>B.P. 128–133° C. under 0.01 mm. Hg. | ...do..... | $(C_2H_5O)_3P$ | $(C_2H_5O)_2\overset{O}{\underset{\|}{P}}-O\overset{CH_3}{\underset{}{C}}=C\overset{Cl}{\underset{COOC_2H_4O-\bigcirc}{}}$ | 197–203 | 0.15 |
| 17 | $CH_3COCH_2COOC_2H_4OC_2H_4OCH_3$<br>B.P. 104–110° C. under 0.05 mm. Hg. | monochloride. | $(CH_3O)_3P$ | $(CH_3O)_2\overset{O}{\underset{\|}{P}}-O\overset{CH_3}{\underset{}{C}}=C\overset{H}{\underset{COOC_2H_4OC_2H_4OCH_3}{}}$ | 155 | 0.06 |
| 18 | $CH_3COCH_2COOC_2H_4OC_2H_4OCH_3$<br>B.P. 104–110° C. under 0.05 mm. Hg. | ...do..... | $(C_2H_5O)_3P$ | $(C_2H_5O)_2\overset{O}{\underset{\|}{P}}-O\overset{CH_3}{\underset{}{C}}=C\overset{H}{\underset{COOC_2H_4OC_2H_4OCH_3}{}}$ | 157–160 | 0.03 |
| 19 | $CH_3COCH_2COOC_2H_4OC_2H_4OCH_3$<br>B.P. 104–110° C. under 0.05 mm. Hg. | dichloride. | $(CH_3O)_3P$ | $(CH_3O)_2\overset{O}{\underset{\|}{P}}-O\overset{CH_3}{\underset{}{C}}=C\overset{Cl}{\underset{COOC_2H_4OC_2H_4OCH_3}{}}$ | 164 | 0.2 |
| 20 | $CH_3COCH_2COOC_2H_4OC_2H_4OCH_3$<br>B.P. 104–110° C. under 0.05 mm. Hg. | dichloride. | $(C_2H_5O)_3P$ | $(C_2H_5O)_2\overset{O}{\underset{\|}{P}}-O\overset{CH_3}{\underset{}{C}}=C\overset{Cl}{\underset{COOC_2H_4OC_2H_4OCH_3}{}}$ | 184 | 0.25 |
| 21 | $CH_3COCH_2COOC_2H_4OC_2H_4OC_2H_5$ | monochloride. | $(CH_3O)_3P$ | $(CH_3O)_3\overset{O}{\underset{\|}{P}}-O\overset{CH_3}{\underset{}{C}}=C\overset{H}{\underset{COOC_2H_4OC_2H_4OC_2H_5}{}}$ | 155–158 | 0.05 |
| 22 | $CH_3COCH_2COOC_2H_4OC_2H_4OC_2H_5$<br>B.P. 104° C. under 0.03 mm. Hg. | ...do..... | $(C_2H_5O)_3P$ | $(C_2H_5O)_2\overset{O}{\underset{\|}{P}}-O\overset{CH_3}{\underset{}{C}}=C\overset{H}{\underset{COOC_2H_4OC_2H_4OC_2H_5}{}}$ | 145 | 0.015 |
| 23 | $CH_3COCH_2COOC_2H_4OC_2H_4OC_2H_5$<br>B.P. 104° C. under 0.03 mm. Hg. | ...do..... | $(iso\ C_3H_7O)_3P$ | $(iso\ C_3H_7O)_2\overset{O}{\underset{\|}{P}}-O\overset{CH_3}{\underset{}{C}}=C\overset{H}{\underset{COOC_2H_4OC_2H_4OC_2H_5}{}}$<br>non-distillable oil, readily soluble in organic solvents, in water <1% soluble. | -------- | ------ |
| 24 | $CH_3COCH_2COOC_2H_4OC_2H_4OC_2H_5$ | monochloride. | $(C_3H_5O)_3P$ | $(CH_2=CH-CH_2O)_2\overset{O}{\underset{\|}{P}}-O\overset{CH_3}{\underset{}{C}}=C\overset{H}{\underset{COOC_2H_4OC_2H_4OC_2H_5}{}}$<br>oil readily soluble in organic solvents, in water <1% soluble. | -------- | ------ |
| 25 | $CH_3COCH_2COOC_2H_4OC_2H_4OC_2H_5$ | ...do..... | $(C_4H_9O)_3P$ | $(C_4H_9O)_2\overset{O}{\underset{\|}{P}}-O\overset{CH_3}{\underset{}{C}}=C\overset{H}{\underset{COOC_2H_4OC_2H_4OC_2H_5}{}}$<br>barely distillable oil, readily soluble in organic solvents, in water <1% soluble. | -------- | ------ |
| 26 | $CH_3COCH_2COOC_2H_4OC_2H_4OC_2H_5$ | dichloride. | $(CH_3O)_3P$ | $(CH_3O)_2\overset{O}{\underset{\|}{P}}-O\overset{CH_3}{\underset{}{C}}=C\overset{Cl}{\underset{COOC_2H_4OC_2H_4OC_2H_5}{}}$ | 158–160 | 0.12 |

| No. | Acetoacetic acid ester | Degree of halogenation of the acetoacetic acid ester in α-position | Phosphite | Phosphoric acid ester | Boiling at °C | under mm. Hg |
|---|---|---|---|---|---|---|
| 27 | $CH_3COCH_2COOC_2H_4OC_2H_4OC_2H_5$<br>B.P. 104° C. under 0.03 mm. Hg. | dichloride. | $(C_2H_5O)_3P$ | $(C_2H_5O)_2\overset{O}{\overset{\|}{P}}-O\overset{CH_3}{\underset{}{C}}=C\overset{Cl}{\underset{COOC_2H_4OC_2H_4OC_2H_5}{}}$ | 158 | 0.04 |
| 28 | $CH_3COCH_2COOC_2H_4OC_2H_4OC_3H_7$<br>B.P. 102° C. under 0.01 mm. Hg. | monochloride. | $(CH_3O)_3P$ | $(CH_3O)_2\overset{O}{\overset{\|}{P}}-O\overset{CH_3}{\underset{}{C}}=C\overset{H}{\underset{COOC_2H_4OC_2H_4OC_3H_7}{}}$ | 142 | 0.02 |
| 29 | $CH_3COCH_2COOC_2H_4OC_2H_4OC_3H_7$<br>B.P. 102° C. under 0.01 mm. Hg. | monochloride. | $(C_2H_5O)_3P$ | $(C_2H_5O)_2\overset{O}{\overset{\|}{P}}-O\overset{CH_3}{\underset{}{C}}=C\overset{H}{\underset{COOC_2H_4OC_2H_4OC_3H_7}{}}$ | 146–152 | 0.03 |
| 30 | $CH_3COCH_2COOC_2H_4OC_2H_4OC_3H_7$<br>B.P. 102° C. under 0.01 mm. Hg. | dichloride. | $(CH_3O)_3P$ | $(CH_3O)_2\overset{O}{\overset{\|}{P}}-O\overset{CH_3}{\underset{}{C}}=C\overset{Cl}{\underset{COOC_2H_4OC_2H_4OC_3H_7}{}}$<br>non-distillable oil, readily soluble in acetone, i-propanol. | ------ | ------ |
| 31 | $CH_3COCH_2COOC_2H_4OC_2H_4OC_3H_7$<br>B.P. 102° C. under 0.01 mm. Hg. | dichloride. | $(C_2H_5O)_3P$ | $(C_2H_5O)_2\overset{O}{\overset{\|}{P}}-O\overset{CH_3}{\underset{}{C}}=C\overset{Cl}{\underset{COOC_2H_4OC_2H_4OC_3H_7}{}}$<br>non-distillable oil, readily soluble in acetone, i-propanol. | ------ | ------ |
| 32 | $CH_3COCH_2COOC_2H_4OCH(CH_3)_2$<br>B.P. 76–80° C. under 0.01 mm. Hg. | monochloride. | $(CH_3O)_3P$ | $(CH_3O)_2\overset{O}{\overset{\|}{P}}-O\overset{CH_3}{\underset{}{C}}=C\overset{H}{\underset{COOC_2H_4OCH(CH_3)_2}{}}$ | 131 | 0.02 |
| 33 | $CH_3COCH_2COOC_2H_4OCH(CH_3)_2$<br>B.P. 76–80° C. under 0.01 mm. Hg. | ---do----- | $(C_2H_5O)_3P$ | $(C_2H_5O)_2\overset{O}{\overset{\|}{P}}-O\overset{CH_3}{\underset{}{C}}=C\overset{H}{\underset{COOC_2H_4OCH(CH_3)_2}{}}$ | 130 | 0.01 |
| 34 | $CH_3COCH_2COOC_2H_4OCH(CH_3)_2$<br>B.P. 76–80° C. under 0.01 mm. Hg. | dichloride. | $(CH_3O)_3P$ | $(CH_3O)_2\overset{O}{\overset{\|}{P}}-O\overset{CH_3}{\underset{}{C}}=C\overset{Cl}{\underset{COOC_2H_4OCH(CH_3)_2}{}}$ | 137 | 0.07 |
| 35 | $CH_3COCH_2COOC_2H_4OCH(CH_3)_2$<br>B.P. 76–80° C. under 0.01 mm. Hg. | ---do----- | $(C_2H_5O)_3P$ | $(C_2H_5O)_2\overset{O}{\overset{\|}{P}}-O\overset{CH_3}{\underset{}{C}}=C\overset{Cl}{\underset{COOC_2H_4OCH(CH_3)_2}{}}$ | 142 | 0.04 |
| 36 | $CH_3COCH_2COOC_2H_4OC_4H_9(iso)$<br>B.P. 87° C. under 0.01 mm. Hg. | monochloride. | $(CH_3O)_3P$ | $(CH_3O)_2\overset{O}{\overset{\|}{P}}-O\overset{CH_3}{\underset{}{C}}=C\overset{H}{\underset{COOC_2H_4OC_4H_9(iso)}{}}$ | 127–131 | 0.02 |
| 37 | $CH_3COCH_2COOC_2H_4OC_4H_9(iso)$<br>B.P. 87° C. under 0.01 mm. Hg. | ---do----- | $(C_2H_5O)_3P$ | $(C_2H_5O)_2\overset{O}{\overset{\|}{P}}-O\overset{CH_3}{\underset{}{C}}=C\overset{H}{\underset{COOC_2H_4OC_4H_9(iso)}{}}$ | 130–135 | 0.02 |
| 38 | $CH_3COCH_2COOC_2H_4OC_4H_9(iso)$<br>B.P. 87° C. under 0.01 mm. Hg. | dichloride. | $(CH_3O)_3P$ | $(CH_3O)_2\overset{O}{\overset{\|}{P}}-O\overset{CH_3}{\underset{}{C}}=C\overset{Cl}{\underset{COOC_2H_4OC_4H_9(iso)}{}}$ | 150–153 | 0.08 |
| 39 | $CH_3COCH_2COOC_2H_4OC_4H_9(iso)$ | ---do----- | $(C_2H_5O)_3P$ | $(C_2H_5O)_2\overset{O}{\overset{\|}{P}}-O\overset{CH_3}{\underset{}{C}}=C\overset{Cl}{\underset{COOC_2H_4OC_4H_9(iso)}{}}$ | 138–145 | 0.03 |
| 40 | $CH_3COCH_2COOC_2H_4OCH_2C_6H_5$<br>B.P. 136–139° C. under 0.02 mm. Hg. | monochloride. | $(CH_3O)_3P$ | $(CH_3O)_2\overset{O}{\overset{\|}{P}}-O\overset{CH_3}{\underset{}{C}}=C\overset{H}{\underset{COOC_2H_4OCH_2C_6H_5}{}}$<br>non-distillable oil, readily soluble in acetone and i-propanol. | ------ | ------ |
| 41 | $CH_3COCH_2COOC_2H_4OCH_2C_6H_5$<br>B.P. 136–139° C. under 0.02 mm. Hg. | ---do----- | $(C_2H_5O)_3P$ | $(C_2H_5O)_2\overset{O}{\overset{\|}{P}}-O\overset{CH_3}{\underset{}{C}}=C\overset{H}{\underset{COOC_2H_4OCH_2C_6H_5}{}}$<br>non-distillable oil, readily soluble in acetone and i-propanol. | ------ | ------ |

| No. | Acetoacetic acid ester | Degree of halogenation of the acetoacetic acid ester in α-position | Phosphite | Phosphoric acid ester | Boiling at °C. | under mm. Hg |
|---|---|---|---|---|---|---|
| 42 | $CH_3COCH_2COOC_2H_4OCH_2$—⌬<br>B.P. 136–139° C. under 0.02 mm. Hg. | dichloride. | $(CH_3O)_3P$ | $(CH_3O)_2\overset{O}{\underset{\|}{P}}-O\underset{COOC_2H_4OCH_2—⌬}{\overset{CH_3}{\underset{\|}{C}}=C\overset{Cl}{}}$<br>non-distillable oil, readily soluble in acetone and i-propanol. | | |
| 43 | $CH_3COCH_2COOCH\underset{CH_2OCH_3}{\overset{CH_2OCH_3}{<}}$<br>B.P. 91–94° C. under 0.01 mm. Hg. | monochloride. | $(CH_3O)_3P$ | $(CH_3O)_2\overset{O}{\underset{\|}{P}}-OC=C\underset{COOCH(CH_2OCH_3)_2}{\overset{CH_3\ \ H}{}}$ | 127–134 | 0.01 |
| 44 | $CH_3COCH_2COOCH\underset{CH_2OCH_3}{\overset{CH_2OCH_3}{<}}$<br>B.P. 91–94° C. under 0.01 mm. Hg. | ...do..... | $(C_2H_5O)_3P$ | $(C_2H_5O)_2\overset{O}{\underset{\|}{P}}-OC=C\underset{COOCH(CH_2OCH_3)_2}{\overset{CH_3\ \ H}{}}$ | 134–138 | 0.01 |
| 45 | $CH_3COCH_2COOCH\underset{CH_2OCH_3}{\overset{CH_2OCH_3}{<}}$<br>B.P. 91–94° C. under 0.01 mm. Hg. | dichloride. | $(CH_3O)_3P$ | $(CH_3O)_2\overset{O}{\underset{\|}{P}}-OC=C\underset{COOCH(CH_2OCH_3)_2}{\overset{CH_3\ \ Cl}{}}$ | 158–160 | 0.15 |
| 46 | $CH_3COCH_2COOCH\underset{CH_2OCH_3}{\overset{CH_2OCH_3}{<}}$<br>B.P. 91–94° C. under 0.01 mm. Hg. | ...do..... | $(C_2H_5O)_3P$ | $(C_2H_5O)_2\overset{O}{\underset{\|}{P}}-OC=C\underset{COOCH(CH_2OCH_3)_2}{\overset{CH_3\ \ Cl}{}}$ | 142–145 | 0.01 |
| 47 | $CH_3COCH_2COO(C_2H_4O)_9CH_3$ | monochloride. | $(CH_3O)_3P$ | $(CH_3O)_2\overset{O}{\underset{\|}{P}}-OC=C\underset{COO(C_2H_4O)_9CH_3}{\overset{CH_3\ \ H}{}}$<br>non-distillable, very readily soluble in water, acetone and alcohol. | | |
| 48 | $CH_3COCH_2COO(C_2H_4O)_9CH_3$ | ...do..... | $(C_2H_5O)_3P$ | $(C_2H_5O)_2\overset{O}{\underset{\|}{P}}-OC=C\underset{COO(C_2H_4O)_9CH_3}{\overset{CH_3\ \ H}{}}$<br>non-distillable, very readily soluble in water, acetone and alcohol. | | |
| 49 | $CH_3COCH_2COO(C_2H_4O)_9CH_3$ | dichloride. | $(CH_3O)_3P$ | $(CH_3O)_2\overset{O}{\underset{\|}{P}}-OC=C\underset{COO(C_2H_4O)_9CH_3}{\overset{CH_3\ \ Cl}{}}$<br>non-distillable, soluble in water, acetone and alcohol. | | |
| 50 | $CH_3COCH_2COO(C_2H_4O)_9CH_3$ | ...do..... | $(C_2H_5O)_3P$ | $(C_2H_5O)_2\overset{O}{\underset{\|}{P}}-OC=C\underset{COO(C_2H_4O)_9CH_3}{\overset{CH_3\ \ Cl}{}}$<br>non-distillable, soluble in water, acetone and alcohol. | | |

*Example 7*

A mixture of 22.45 parts of α-chloroacetoacetic acid-2-ethylmercapto ethyl ester (acetoacetic acid-2-ethylmercapto ethyl ester, boiling at 88° C. under 0.04 mm. Hg pressure) and 25 parts by volume of chlorobenzene is heated to 140° C. This mixture is treated dropwise with 13.6 parts of trimethyl phosphite and then stirred for 1 hour at the boil, after which time 3.9 parts of methyl chloride have collected in a cooled receptacle. The readily volatile constituents are removed in vacuo at 90° C. bath temperature, to yield as residue 26.4 parts of a pale-yellow oil which partially decomposes on being distilled in a high vacuum. The compound boils at 110° C. under 0.1 mm. Hg pressure and corresponds to the formula

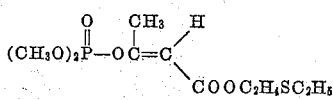

*Example 8*

When 17.8 parts of α-chloroacetoacetic acid-2-ethylmercapto ethyl ester are reacted with 14.5 parts of triethyl phosphite as described in Example 7, the compound of the formula

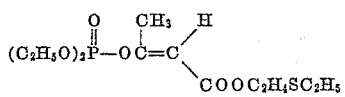

is obtained as a pale-yellow oil which is sparingly soluble in water but readily soluble in acetone and propanol.

Example 9

When 25.9 parts of α:α-dichloroacetoacetic acid-2-ethylmercapto ethyl ester are reacted with 13.6 parts of trimethyl phosphite in 30 parts by volume of chlorobenzene as described in Example 7, the compound of the formula

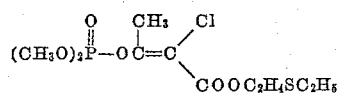

is obtained; it cannot be distilled in a high vacuum and is sparingly soluble in water and readily soluble in acetone and propanol.

Example 10

When 10.8 parts of α:α-dichloroacetoacetic acid-2-ethylmercapto ethyl ester are reacted with 7.6 parts of triethyl phosphite in 18 parts by volume of chlorobenzene as described in Example 7, the compound of the formula

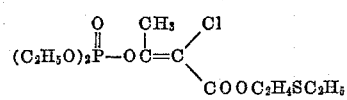

is obtained; it cannot be distilled in a high vacuum and is readily soluble in acetone and propanol and sparingly soluble in water.

Example 11

12.62 parts of monochloroacetoacetic acid carbitol ester (see Table No. 21) are mixed with 20 parts by volume of chlorobenzene and heated at 130° C. 9.65 parts of O-diethyl-N-diethylamidophosphite $$(C_2H_5)_2NP(OC_2H_5)_2$$

are added dropwise. The reaction is completed by boiling the mixture under reflux for one hour, by which time 2.3 parts of ethyl chloride have collected in a cooled receptacle. The volatile constituents and the solvent are removed in vacuo at 90° C., then in a high vacuum at 100° C. bath temperature. The residue (17.2 parts) has the empirical formula $C_{16}H_{32}NO_7P$ and cannot be distilled in a high vacuum. The compound is less than 1% soluble in water but readily soluble in acetone and iso-propanol.

|              | Percent |
|---|---|
| P found      | 8.3     |
| P calculated | 8.12    |

Example 12

2.3 parts of sodium chips are added to 150 parts by volume of dry ether; 21.8 parts of acetoacetic acid carbitol ester are added dropwise to the mixture in the course of ¼ of an hour. The mixture is heated at the boil until all the sodium has dissolved. 17.25 parts of freshly distilled diethylchlorophosphate $(C_2H_5O)_2POCl$ are added dropwise to this solution at 20–30° C., and the whole is heated for 14 hours at the boil. The mixture is allowed to cool and filtered off from the separted sodium chloride (5.45 parts). The filtrate is washed with 10 parts by volume of sodium carbonate solution, then with 10 parts by volume of water and then dried over sodium sulfate. After evaporating the solvent, there are obtained as residue 30.85 parts of the condensation product of the empirical formula $C_{14}H_{27}O_8P$ which boils at 143° C. in high vacuum under 0.04 mm. of pressure.

|              | Percent |
|---|---|
| P found      | 8.82    |
| P calculated | 8.74    |

Example 13

When the sodium salt of 21.8 parts of acetoacetic acid caribitol ester is reacted with 18.85 parts of diethyl-thiochlorophosphate $(C_2H_5O)_2PSCl$ in an analogous manner to that described in Example 12, there are obtained after working up in the usual manner 30.8 parts of a condensation product of the empirical formula $C_{14}H_{27}O_7PS$ which cannot be distilled in a high vacuum. The compound is less than 1% soluble in water but very readily soluble in acetone and iso-propanol.

|              | Percent |
|---|---|
| P found      | 8.84    |
| P calculated | 8.36    |

Example 14

2.3 parts of sodium are added to 70 parts by volume of absolute ether. 13.8 parts of freshly distilled diethyl phosphite are added dropwise at 20–30° C. The mixture is heated at the boil until all the sodium has dissolved. 25.25 parts of monochloroacetoacetic acid carbitol ester dissolved in 20 parts by volume of ether are added dropwise at 20–30° C. in the course of half an hour. The reaction mixture is then kept at boiling temperature for 16 hours. The ethereal solution is washed with 10 parts by volume of sodium carbonate solution and twice with 10 parts by volume of water each time, dried over sodium sulfate and evaporated under reduced pressure at 60° C. bath temperature. The residue (30.6 parts) is distilled in a high vacuum. Boiling point=160–168° C. under 0.05 mm. of pressure.

The phosphorus analysis of the condensation product obtained corresponds to the empirical formula $C_{14}H_{27}O_8P$.

|              | Percent |
|---|---|
| P found      | 8.54    |
| P calculated | 8.74    |

Example 15

2 parts of the condensation product No. 3, 5, 9 or 17 in the table in Example 6 are mixed with 7 parts of iso-propanol and with 1 part of the condensation product from 1 molecular proportion of tertiary octylphenol with 8 mols of ethylene oxide. A clear solution is obtained which can be used as a spraying preparation concentrate and can be emulsifed by being poured into water.

To determine the contact effect on aphids the following experiment was carried out with sprays containing respectively 0.08%, 0.04%, 0.02% and 0.01% of the active principle.

Broad beans, strongly infested with aphids, were sprayed all over and after 48 hours the effect was determined. When the spraying had produced a 100% effect, the plants were infected with fresh aphids and the effect again inspected after another 48 hours. The results achieved are listed in the following table:

| Concentration of spray | Effect on aphids | | | | | | | |
|---|---|---|---|---|---|---|---|---|
| | after 48 hours | | | | 48 hours after renewed infection | | | |
| | No. 3 | No. 5 | No. 9 | No. 17 | No. 3 | No. 5 | No. 9 | No. 17 |
| 0.08% | ++ | ++ | ++ | ++ | ++ | ++ | ++ | ++ |
| 0.04% | ++ | ++ | ++ | ++ | ++ | ++ | ++ | ++ |
| 0.02% | ++ | ++ | ++ | ++ | ++ | ++ | ++ | ++ |
| 0.01% | ++ | ++ | ++ | ++ | ++ | ++ | ++ | ++ |

For each plant a symbol is used: + signifies that no living aphids were found; − signifies an insufficient or no effect; / signifies good effect, only few living aphids.

(B) To determine the effect on aphids by diffusion through the leaves the following experiment was carried out. The spray used contained 0.08% of active principle.

Of broad beans that were infested with aphids only on the underside of the leaves, only the top side of the leaves were sprayed with the afore-mentioned spray, and after 48 hours the underside of the leaves were inspected for results. The results thus obtained are shown in the following table:

| Concentration of spray | Effect on aphids | | | |
| --- | --- | --- | --- | --- |
| | No. 3 | No. 5 | No. 9 | No. 17 |
| 0.08% | ++++ | ++++ | ++++ | ++++ |
| 0.04% | ++++ | ++++ | ++++ | ++++ |
| 0.02% | ++++ | ++++ | ++++ | ++++ |
| 0.01% | ++++ | ++++ | ++++ | ++++ |

(C) To determine the inner therapeutic (the so-called systemic) effect the following experiment was carried out with sprays containing respectively 0.08%, 0.04%, 0.02% and 0.01% of active principle.

From broad beans (*Vicia fabae*), strongly infested with aphids (*Doralis fabae*), the bottom leaves were removed and halfway up the stem a colour mark was made. The bottom half of the stem of two plants each was then sprayed with the preparations of the under-mentioned concentrations. After 48 hours the effects on aphids in the upper, unsprayed half of the plants was inspected. The results obtained in this manner are shown in the following table:

| Concentration of spray | Effect on aphids after 48 hours | | | |
| --- | --- | --- | --- | --- |
| | No. 3 | No. 5 | No. 9 | No. 17 |
| 0.08% | ++ | ++ | ++ | ++ |
| 0.04% | ++ | ++ | ++ | ++ |
| 0.02% | ++ | ++ | ++ | ++ |
| 0.01% | ++ | ++ | ++ | +/ |

For each plant a symbol is used: + signifies that no living aphids were found; − signifies an insufficient or no effect; / signifies good effect, only few living aphids. In addition, compounds Nos. 3, 5, 9 and 17 displays a good acaricidal action against red spiders (Tetranychidae).

The spray preparation concentrates can alternatively be manufactured with wetting and emulsifying agents other than those mentioned above. For this purpose are suitable non-ionic products, for example condensation products of aliphatic alcohols, amines, or carboxylic acids with a long-chain residue of about 10 to 30 carbon atoms with ethylene oxide, such as the condensation product of octadecyl alcohol with 25 to 30 mols of ethylene oxide; or the condensation product of soybean fatty acid with 30 mols of ethylene oxide; or of commercial octadecenylamine with 15 mols of ethylene oxide; or of dodecylmercaptan with 12 mols of ethylene oxide. Among suitable anion-active emulsifiers may be mentioned the sodium salt of dodecyl alcohol-sulfonic acid ester, the sodium salt of dodecylbenzenesulfonic acid, the potassium salt or triethanolamine salt of oleic acid or of abietic acid or of mixtures of these acids, or the sodium salt of a petroleum-sulfonic acid.

Instead of isopropanol there may be used other solvents for the manufacture of the spray preparation concentrates, for example ethanol, methanol, butanol, acetone, methylethyl ketone, methyl-cyclohexanol, benzene, toluene, xylene, kerosenes or petroleum fractions, or mixtures of two or more solvents.

*Example 16*

2 parts of the condensation product No. 3, 5, 9, or 17 in the table in Example 6 are mixtd with 9 parts of chalk and 1 part of wetting agent. A dusting powder is obtained which can be suspended in water to form a liquid spray. When the walls of stables are treated with such a spray containing 0.4% of active principle, a good effect on flies and midges is observed.

*Example 17*

In experiments carried out to test the effect on aphids by the methods described in Example 15 under (a) and (b), the compounds of Examples 1–10 and the compounds Nos. 1, 2, 4, 6–8, 10–16, 18–41 and 43–48 in the table in Example 6 likewise displayed good to excellent effects.

In tests for their aphidicidal effect by the method described under (c) in Example 15, the compounds referred to in Example 5 and the compounds Nos. 4, 6, 8, 10, 18, 21, 22, 28, 29, 32, 33, 36, 37, 40, 43 and 44 in the table in Example 6 likewise produced a good to very good systemic effect.

The compounds in Examples 5, 8, 9, 10 and the compounds Nos. 4, 6, 10, 13, 14, 15, 16, 18, 21, 22, 28, 29, 32, 33, 36, 37, 40, 41, 43, 44, 47 and 48 in the table in Example 6 also displayed a good to outstanding acaricidal effect on red spiders.

What is claimed is:

1. Organic phosphorus compounds of the formula

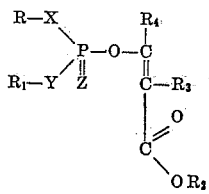

in which each of R and $R_1$ is a member selected from the group consisting of lower alkyl, cyclohexyl, benzyl and phenyl radicals; $R_2$ is a member selected from the group consisting of (a) an alkyl radical containing up to 19 carbon atoms which is interrupted by 2 to 9 ether oxygen atoms, (b) a radical of the formula

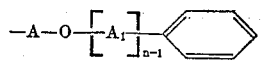

in which A and $A_1$ represent lower alkylene radicals and $n$ is a positive whole number of at most 2, and (c) a lower alkyl radical interrupted by a sulfur atom; $R_3$ represents a member selected from the group consisting of a hydrogen atom, a chlorine atom and a lower alkyl radical; $R_4$ represents a member selected from the group consisting of a lower alkyl, a cyclohexyl and a phenyl radical; each of X and Y is a member selected from the group consisting of —O— and

wherein $R_5$ is a lower alkyl radical; and Z represents a member selected from the group consisting of an oxygen atom and a sulfur atom.

2. Organic phosphorus compounds of the formula

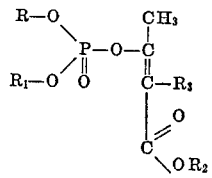

in which R and $R_1$ are lower alkyl radicals; $R_2$ represents a member selected from the group consisting of (a) an alkyl radical containing up to 19 carbon atoms which is interrupted by 2 to 9 ether oxygen atoms, (b) a radical of the formula

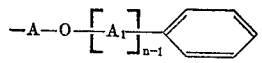

in which A and $A_1$ represent lower alkylene radicals and $n$ is a positive whole number of at most 2, and (c) a lower alkyl radical interrupted by a sulfur atom; and $R_3$ is a member selected from the group consisting of a hydrogen atom and a chlorine atom.

3. Organic phosphorus compounds of the general formula

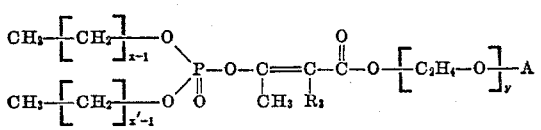

in which $R_3$ is selected from the group consisting of a hydrogen atom and a chlorine atom, A is an alkyl radical containing 1 to 4 carbon atoms, $x$ and $x'$ each represent a whole number of at most 2 and $y$ is a whole number from 2 to 9, the whole group

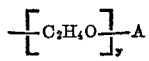

containing at most 19 carbon atoms.

4. Organic phosphorus compounds of the general formula

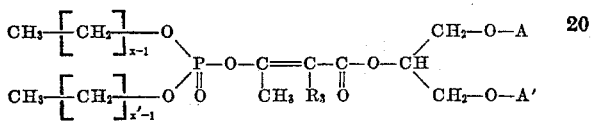

in which $R_3$ is selected from the group consisting of a hydrogen atom and a chlorine atom, A and A' each are an alkyl radical containing 1 to 4 carbon atoms and $x$ and $x'$ each represent a whole number of at most 2.

5. Organic phosphorus compounds of the general formula

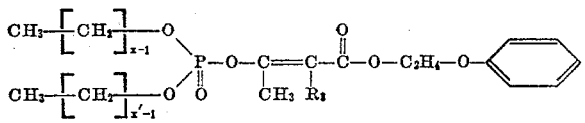

in which $R_3$ is selected from the group consisting of a hydrogen atom and a chlorine atom and $x$ and $x'$ each represent a whole number of at most 2.

6. The compound of the formula

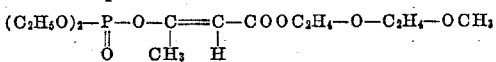

7. The compound of the formula

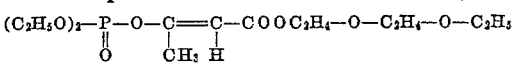

8. The compound of the formula

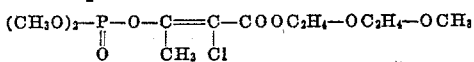

9. The compound of the formula

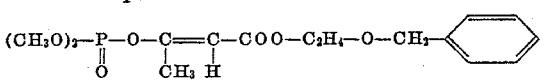

10. The compound of the formula

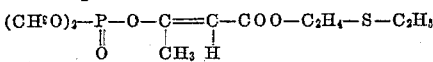

11. The compound of the formula

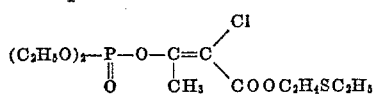

References Cited in the file of this patent

UNITED STATES PATENTS

| | | |
|---|---|---|
| 2,685,552 | Stiles | Aug. 3, 1954 |
| 2,894,618 | Lorenz | July 7, 1959 |
| 2,982,686 | Whetstone et al. | May 2, 1961 |

OTHER REFERENCES

Agricultural Chemicals, April 1953, pp. 47 to 50, 137 and 139.

Journal Economic Entomology, April 1959, vol. 52, pp. 270 to 276.

UNITED STATES PATENT OFFICE
CERTIFICATE OF CORRECTION

Patent No. 3,014,955                 December 26, 1961

Ernst Beriger

It is hereby certified that error appears in the above numbered patent requiring correction and that the said Letters Patent should read as corrected below.

Column 2, line 47, for "bromide" read -- bromine --; columns 7 and 8, in the table, column 4, line 7 thereof, for "$(CH_3O)_3O$" read -- $(CH_3O)_3P$ --; columns 9 and 10, in the table, column 5, the formula opposite item 21 should appear as shown below instead of as in the patent:

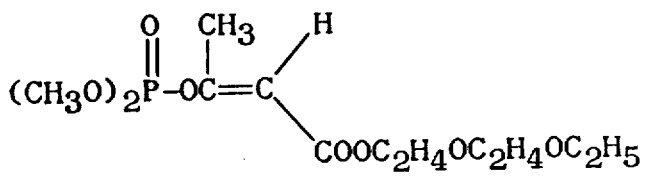

columns 11 and 12, in the table, column 5, the formula opposite item 34 should appear as shown below instead of as in the patent:

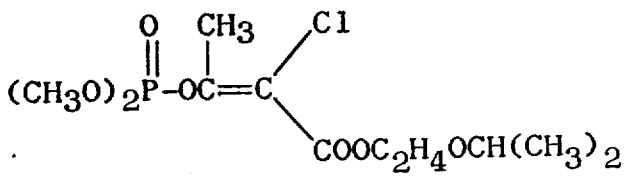

same columns 11 and 12, in the table, column 4, line 14 thereof, for "$(CH_3O)_2P$" read -- $(CH_3O)_3P$ --; column 16, line 7, for "caribitol" read -- carbitol --; column 17, line 72, for "mixtd" read -- mixed --; column 20, lines 18 to 20, the formula should appear as shown below instead of as in the patent:

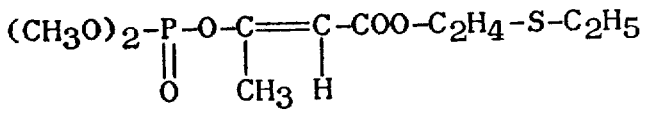

Signed and sealed this 11th day of September 1962.

(SEAL)
Attest:

ERNEST W. SWIDER
Attesting Officer

DAVID L. LADD
Commissioner of Patents